US012586536B2

(12) United States Patent
Gim

(10) Patent No.: US 12,586,536 B2
(45) Date of Patent: Mar. 24, 2026

(54) DISPLAY DEVICE AND VEHICLE SYSTEM INCLUDING IT

(71) Applicant: LG Display Co., Ltd., Seoul (KR)

(72) Inventor: SeonGeun Gim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/771,631

(22) Filed: Jul. 12, 2024

(65) Prior Publication Data

US 2025/0182699 A1 Jun. 5, 2025

(30) Foreign Application Priority Data

Dec. 5, 2023 (KR) ........................ 10-2023-0174009

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2300/0814* (2013.01); *G09G 2310/0267* (2013.01); *G09G 2310/08* (2013.01); *G09G 2330/022* (2013.01); *G09G 2380/10* (2013.01)

(58) Field of Classification Search
CPC ... G09G 2310/063; G09G 2330/00-12; G09G 3/3266; G09G 3/32; G09G 2300/0814; G09G 2310/0267; G09G 2310/08; G09G 2330/022; G09G 2380/10
See application file for complete search history.

(56) References Cited

U.S. PATENT DOCUMENTS

2009/0073157 A1* 3/2009 Lin ...................... G09G 3/3611 345/212
2009/0322725 A1* 12/2009 David ...................... G09G 3/18 345/211
2011/0199397 A1* 8/2011 Ko ...................... G09G 3/3688 345/212
2021/0043149 A1* 2/2021 Yoo ...................... G09G 3/3291

* cited by examiner

*Primary Examiner* — Roberto W Flores
(74) *Attorney, Agent, or Firm* — Seed Intellectual Property Law Group LLP

(57) ABSTRACT

The present disclosure provides a display device and vehicle system including the display device. The display device includes a display panel that includes a plurality of subpixels, a gate driving circuit configured to supply a scan signal and an emission signal to the display panel through a plurality of gate lines, a converter configured to convert a first level circuit power supplied from a host system into a second level circuit power, a logic gate configured to generate a power check signal based on an interface data signal transmitted through an interface line and the second level circuit power, and a timing controller configured to control an emission start signal supplied to the gate driving circuit depending on the power check signal.

20 Claims, 13 Drawing Sheets

| | VCCL | IFD | PC |
|---|---|---|---|
| Case 1 | Low | Low | High |
| Case 2 | High | Low | Low |
| Case 3 | Low | High | Low |
| Case 4 | High | High | Low |

FIG.11

DISPLAY DEVICE AND VEHICLE SYSTEM INCLUDING IT

CROSS-REFERENCE TO RELATED APPLICATION

This application claims priority from Korean Patent Application No. 10-2023-0174009, filed on Dec. 5, 2023, which is hereby incorporated by reference for all purposes as if fully set forth herein.

TECHNICAL FIELD

Embodiments of the disclosure relate to a display device and a vehicle system and, more specifically, to a display device and a vehicle system capable of preventing an accident due to an error in the display panel.

DESCRIPTION OF THE RELATED ART

The growth of the intelligent society leads to increased demand for image display devices and use of various types of display devices, such as liquid crystal displays, organic light emitting displays, etc.

Among these display devices, the organic light emitting display device uses self-emissive organic light emitting diodes, providing advantages, such as a fast response and better contrast ratio, luminous efficiency, luminance, and viewing angle.

The display device may include light emitting elements respectively arranged in a plurality of subpixels disposed on a display panel and cause the light emitting diodes to emit light by controlling the voltage applied to the light emitting elements, thereby displaying images while controlling the brightness of each subpixel.

Recently, the area of use of display devices is gradually expanding, including not only portable computers but also desktop computer monitors, vehicle displays, and wall-mounted televisions.

Such a display device may provide various functions depending on the purpose of the electronic device on which the display panel is mounted. For example, for vehicle display devices, the navigation function may be said to be an essential function.

BRIEF SUMMARY

During the driving process, the display device may turn off abnormally due to shock or overcurrent. In this case, if the screen flickers or display errors, such as horizontal stripes, occur during the abnormal turn-off process of a display device, such as a navigation device, there is a possibility that an accident may occur due to the driver's sudden reaction to the display errors. Accordingly, the inventors of the disclosure have proposed various embodiments of a display device and a vehicle system that may prevent accidents due to a display error when the display panel is abnormally turned off.

Embodiments of the disclosure may provide a display device and a vehicle system that may eliminate display errors by blocking an emission control transistor that controls the light emitting element when the display panel is abnormally turned off.

Embodiments of the disclosure may provide a display device and a vehicle system that may prevent accidents due to display error by determining whether the display panel is abnormally turned off from detecting changes in an interface data signal and a power supply voltage.

Embodiments of the disclosure may provide a display device, comprising a display panel including a plurality of subpixels, a gate driving circuit configured to supply a scan signal and an emission signal to the display panel through a plurality of gate lines, a converter configured to convert a first level circuit power supplied from a host system into a second level circuit power, a logic gate configured to generate a power check signal based on an interface data signal transmitted through an interface line and the second level circuit power, and a timing controller configured to control an emission start signal supplied to the gate driving circuit depending on the power check signal.

Embodiments of the disclosure may provide a vehicle system, comprising a display panel including a plurality of subpixels, a gate driving circuit configured to supply a scan signal and an emission signal to the display panel through a plurality of gate lines, a converter configured to convert a first level circuit power supplied from a host system into a second level circuit power, a logic gate configured to generate a power check signal based on an interface data signal transmitted through an interface line and the second level circuit power, and a timing controller configured to control an emission start signal supplied to the gate driving circuit depending on the power check signal.

According to embodiments of the disclosure, it is possible to prevent accidents due to a display error when the display panel is abnormally turned off.

According to embodiments of the disclosure, it is possible to eliminate display errors and reduce power consumption by blocking an emission control transistor that controls the light emitting element when the display panel is abnormally turned off.

According to embodiments of the disclosure, it is possible to prevent accidents due to a display error by determining whether the display panel is abnormally turned off from detecting changes in an interface data signal and a power supply voltage.

DESCRIPTION OF THE SEVERAL VIEWS OF THE DRAWINGS

The above and other objects, features, and advantages of the disclosure will be more clearly understood from the following detailed description, taken in conjunction with the accompanying drawings, in which:

FIG. 11 illustrates a table of logic gate comparing a second level circuit power and an interface data signal in a display device according to embodiments of the disclosure;

DETAILED DESCRIPTION

Figure 1:
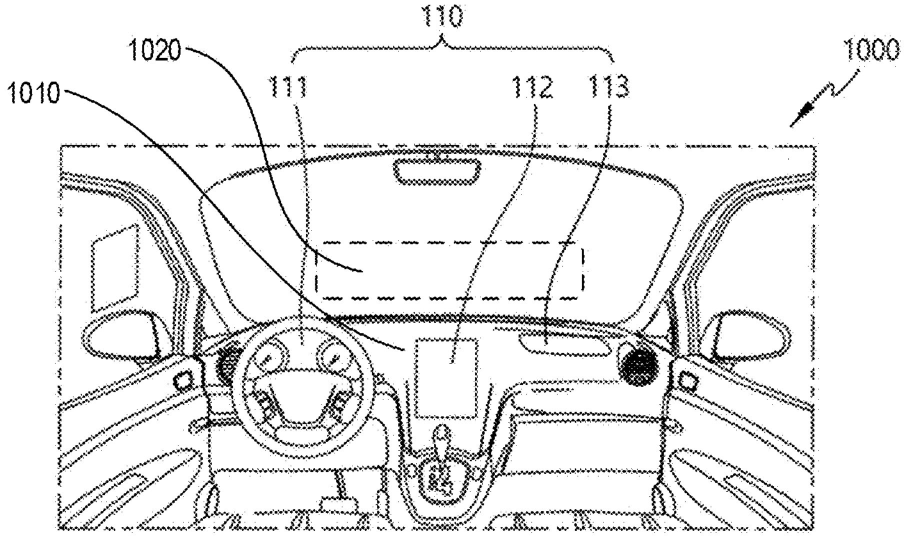
FIG. 1 is a view illustrating an example inside of a vehicle system according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as “including,” “having,” “containing,” “constituting” “make up of,” and “formed of” used herein are generally intended to allow other components to be added unless the terms are used with the term “only.” As used herein, singular forms are intended to include plural forms unless the context clearly indicates otherwise.

Terms, such as “first,” “second,” “A,” “B,” “(A),” or “(B)” may be used herein to describe elements of the disclosure. Each of these terms is not used to define essence, order, sequence, or number of elements, etc., but is used merely to distinguish the corresponding element from other elements.

When it is mentioned that a first element “is connected or coupled to,” “contacts or overlaps,” etc., a second element, it should be interpreted that, not only can the first element “be directly connected or coupled to” or “directly contact or overlap” the second element, but a third element can also be “interposed” between the first and second elements, or the first and second elements can “be connected or coupled to,”, “contact or overlap,” etc., each other via a fourth element. Here, the second element may be included in at least one of two or more elements that “are connected or coupled to,” “contact or overlap,” etc., each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Hereinafter, various embodiments of the disclosure will be described in detail with reference to the accompanying drawings.

FIG. 1 is a view illustrating an example inside of a vehicle according to embodiments of the disclosure.

Referring to FIG. 1, the vehicle system 1000 according to embodiments of the disclosure may include a driver seat, a passenger seat, a dashboard positioned in front of the driver seat and the passenger seat and on which various instruments necessary for driving are disposed, and a center fascia having a control plate of an electronic device.

The dashboard may include a first display panel 111 that displays information necessary for driving, including a speedometer. The first display panel 111 may be referred to as a dashboard display panel.

The first display panel 111 is a display panel capable of safely driving the vehicle system 1000 by transferring information about the driving state of the vehicle system 1000 and operations of various electronic devices provided in the vehicle system 1000 to the driver. A speedometer positioned behind the steering wheel with respect to the driver seat to indicate the driving speed, a tripmeter indicating the driving distance, a tachometer indicating the revolutions per meter (RPM) of the engine, a fuel gauge, a water thermometer, an engine thermometer, and various warning lamps may be displayed through the first display panel 111.

The center fascia is positioned between the driver seat and the passenger seat, and may correspond to an area where the dashboard and the shift lever meet vertically, and an audio, an air conditioner, a heater controller, a navigator, a blower, a cigar jack, an ashtray, a cup holder, and the like may be disposed therein. Further, the center fascia may include a second display panel 112.

The second display panel 112 may direct a route to a destination or display a map image corresponding to a current location, and display a user interface related to control of various electronic devices installed in the vehicle system 1000. Further, when the vehicle system 1000 and the mobile terminal are connected, a screen provided by the mobile terminal may be displayed.

The second display panel 112 positioned between the driver seat and the passenger seat of the vehicle system 1000 may be referred to as a center fascia display panel.

Further, a third display panel 113 for convenience of a passenger in the passenger seat may be additionally installed on the front surface of the passenger seat. The third display panel 113 positioned in the passenger seat may be referred to as a passenger seat display panel.

Further, the display panel 110 may further include at least one of a front window display panel, a side mirror display panel, a rear-view mirror display panel, and a side window display panel, in addition to the dashboard display panel 111, the center fascia display panel 112, and the passenger seat display panel 113. Further, various types of display panels may be installed.

The front window display panel may be a display panel that projects a virtual image to a partial area of the front window capable of viewing the front of the vehicle system 1000. By displaying the speed of the vehicle, the remaining amount of fuel, the route direction information, and the like through the front window display panel, it is possible to minimize the driver's unnecessary gaze changing in different directions.

The side mirror display panel may be a display panel capable of displaying an image of a side surface captured through a side camera in a partial area or an entire area of the side mirror formed to view the side surface of the vehicle system 1000. Accordingly, the driver may identify not only the image of the side surface reflected through the side mirror, but also the image of the side surface captured through the side camera through the side mirror display panel.

The rear-view mirror display panel may be a display panel capable of displaying an image of the rear captured by the rear camera in a partial area or an entire area of the rear-view mirror formed to view the rear of the vehicle system 1000. Accordingly, the driver may identify not only the rear image reflected through the rear-view mirror, but also the rear image captured through the rear camera through the rear-view mirror display panel.

The side window display panel may be a display panel that projects a virtual image onto a partial area of the side window capable of viewing a side surface of the vehicle system 1000. Lots of information about the vehicle system may be displayed through the side window display panel.

As shown in FIG. 1, the various display panels described above may be incorporated into a body 1010 of the vehicle system 1000. Accordingly, the display device (or the display panel), under normal operation, is not separated or detached from the body 1010 of the vehicle system 1000. However, it may be separated in instances where the display needs repair.

The body 1010 of the vehicle system 1000 includes a motor 1020 mounted to the body 1010. The motor 1020 may include a combustion engine, an electric motor, or a hybrid system combining an internal combustion engine (usually fueled by gasoline or diesel) with an electric motor, or the like. Accordingly, in some embodiments, the vehicle system 1000 may include not only conventional fuel vehicles but also electric vehicles or other vehicles that run on clean energy.

Figure 2:
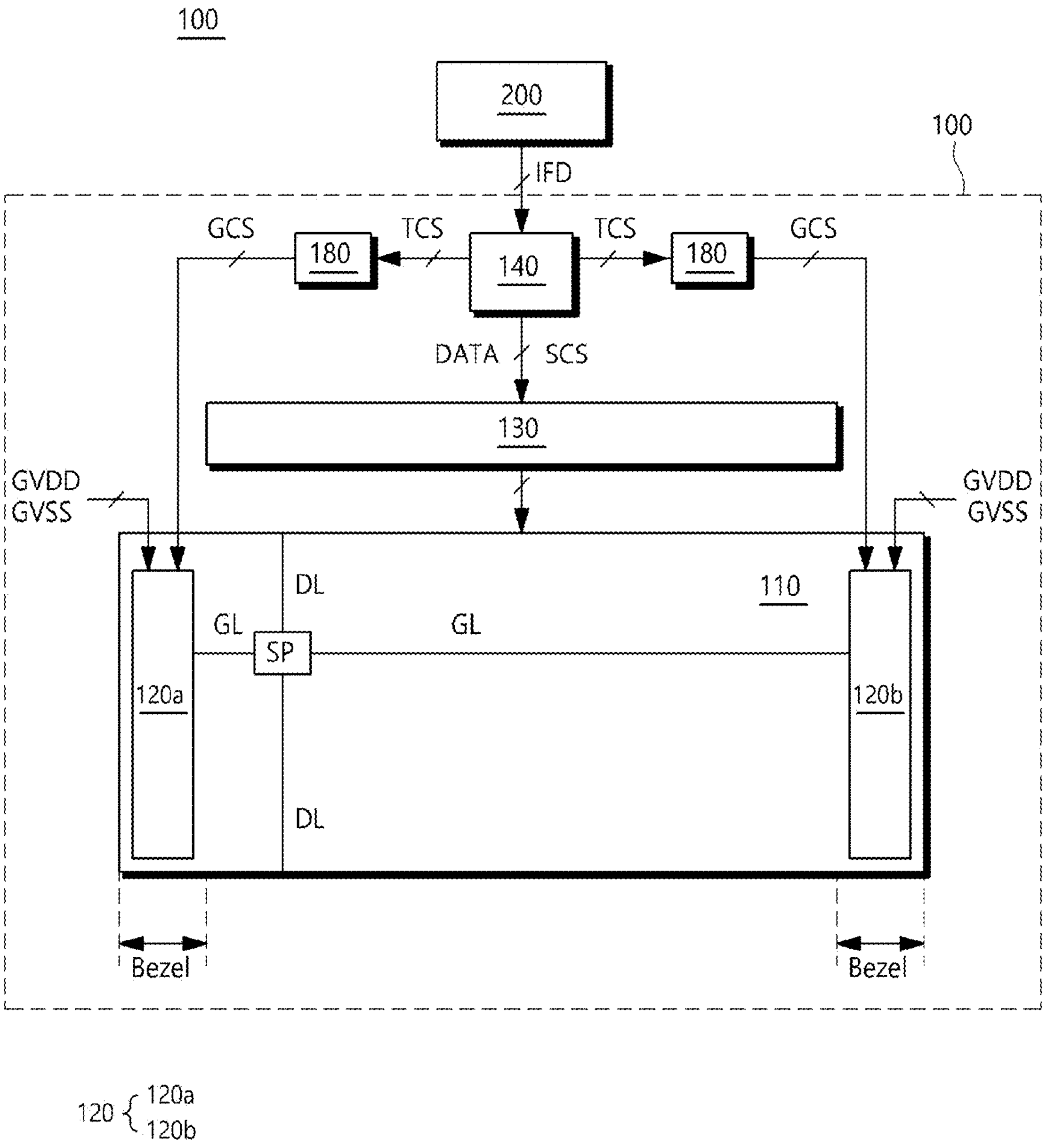
FIG. 2 is a view schematically illustrating a display device for a vehicle system according to embodiments of the disclosure.

FIG. 2 is a view schematically illustrating a display device for a vehicle system according to embodiments of the disclosure.

Referring to FIG. 2, a display device 100 according to embodiments of the disclosure may include a display panel 110, a gate driving circuit 120, a data driving circuit 130, a timing controller 140, and a level shifter 180.

In the display panel 110, a plurality of data lines DL and a plurality of gate lines GL may intersect each other, and subpixels SP may be disposed in a matrix form in each intersection area, forming a subpixel array.

In the case of a liquid crystal display device, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display device, the display panel 110 may be implemented in a top emission scheme, a bottom emission scheme, or a dual-emission scheme.

One subpixel SP may include, e.g., a thin film transistor (TFT) disposed in an area formed by one data line DL and one gate line GL, an light emitting element that emits light according to a data voltage, and a storage capacitor electrically connected to the light emitting element to maintain the voltage. The thin film transistor may include a driving transistor and one or more switching transistors, and may be implemented as a P-type transistor or an N-type transistor. Alternatively, it may be implemented in a hybrid form in which a P-type transistor and an N-type transistor are mixed.

For example, when the display device 100 having a resolution of 2,160×3,840 includes four subpixels SP of white (W), red (R), green (G), and blue (B), 3,840 data lines DL may be connected to 2,160 gate lines GL and four subpixels WRGB, and thus, there may be provided 3,840×4=15,360 data lines DL. Each subpixel SP is disposed in the area formed by the gate line GL and the data line DL.

The timing controller 140 may receive interface data signal IFD from a host system 200 through a predetermined interface schemes and may convert it to image data DATA for using inside.

In a case of the display device 100 for a vehicle system, the host system 200 and the display device 100 may use a low-voltage differential signaling (LVDS) interface. In this case, the interface data signal IFD transmitted from the host system 200 to the display device 100 through the low-voltage differential signaling (LVDS) interface may be referred to as a low-voltage differential data signal.

The low-voltage differential signaling (LVDS) interface is a standard interface defined by ANSI/TIA/EIA-644 for use in areas that require high-speed data transmission, low power consumption, and noise immunity. When using a low-voltage differential signaling (LVDS) interface, the interface data signal IFD is transmitted as a differential input signal with a swing width of about 350 mV, so it has strong immunity to noise and enables high-speed data transmission.

The timing controller 140 may correct the image data DATA to compensate for the driving deviation of the subpixel SP based on the sensing result of the characteristic value (e.g., the threshold voltage or mobility of the driving transistor) of the subpixel and then transmit it to the data driving circuit 130.

The timing controller 140 may receive timing signals, such as a vertical synchronization signal, a horizontal synchronization signal, and a data enable signal as well as the interface data signal IFD from the host system 200. The timing controller 140 generates a source control signal SCS for controlling the operation timing of the data driving circuit 130 and a timing control signal TCS for controlling the operation timing of the gate driving circuit 120 based on the timing signal input from the host system.

The source control signal SCS includes a source sampling clock, a source output enable signal, and the like. The source sampling clock is a clock for controlling the sampling timing of the image data DATA in the data driving circuit 130 based on the rising or falling edge. The source output enable signal is a signal for controlling an output timing for an analog data voltage applied to the display panel 110.

The data driving circuit 130 may include a plurality of source driving integrated chips SDIC. The data driving circuit 130 receives the image data DATA from the timing controller 140. The data driving circuit 130 generates a data voltage by converting the image data DATA into a gamma compensation voltage in response to the source control signal SCS transferred from the timing controller 140, and synchronizes the data voltage with the scan signal of the gate driving circuit 120 and supplies the same to the data lines DL of the display panel 110.

The data driving circuit 130 may be connected to the data line DL of the display panel 110 through a chip on glass (COG) process or a tape automated bonding (TAB) process.

The display device 100 may include a level shifter 180 that generates the gate control signal GCS using the timing control signal TCS output from the timing controller 140 and supplies the generated gate control signal GCS to the gate driving circuit 120. The level shifter 180 may be positioned inside the gate driving circuit 120 or may be positioned on the source printed circuit board on which the data driving circuit 130 is disposed.

The level shifter 180 may convert a transistor-transistor-logic (TTL) level voltage of the timing control signal (TCS) input from the timing controller 140 into a voltage of a turn-on level and a voltage of a turn-off level capable of switching the transistor formed on the display panel 110. Then, the level shifter 180 supplies the gate control signal GCS to the gate driving circuit 120.

The timing control signal TCS may include an on clock, an off clock, an alternating control pulse, and the like.

The gate control signal GCS may include a gate start signal, a gate clock, an even-numbered alternating current (AC) voltage, an odd-numbered AC voltage, a line selection signal, a reset signal, and a panel on signal. The gate clock may be composed of N (where N is a natural number) phase clocks having different phases. When the gate driving circuit 120 includes a scan driving circuit and an emission driving circuit, the gate start signal may include a scan start signal and an emission start signal, and the gate clock may include a scan clock and an emission clock.

For example, in a display device 100 having a resolution of 2,160×3,840, for 2,160 gate lines GL, the case where gate signals are sequentially output from the first gate line to the 2,160th gate line may be referred to as 2,160-phase driving. Or, the case where gate signals are sequentially output on a per-four gate line GL basis, like the case where gate signals are sequentially output from the first gate line to the fourth gate line and then gate signals are sequentially output from the fifth gate line to the eight gate line, is referred to as four-phase driving. In other words, the case where gate signals are sequentially output every N gate lines GL may be referred to as N-phase driving.

When the gate driving circuit 120 includes a scan driving circuit and an emission driving circuit, the gate signal may include a scan signal and an emission signal.

Further, the gate driving circuit 120 may include one or more gate driving integrated circuits GDIC.

Based on the gate control signal GCS input from the level shifter 180 and the one or more power supply voltages GVDD and GVSS input from the power management circuit (not shown), the gate driving circuit 120 may output the display gate signal during the display driving period and output the sensing gate signal for sensing the characteristic value of the subpixel SP during the blank period.

The gate driving circuit 120 may be directly formed on the substrate of the display panel 110 in a gate in panel (GIP) manner.

The gate driving circuit 120 may be formed in a bezel area in which an image is not displayed on the display panel 110, but is not limited thereto. The gate driving circuit 120 may be formed in a double bank structure in which the first gate driving circuit 120*a* is disposed in the first bezel area of the display panel 110 and the second gate driving circuit 120*b* is disposed in the second bezel area of the display panel 110 to minimize distortion of the gate signal due to signal delay.

The timing controller 140 may control the display driving operation and the sensing driving operation for the subpixel lines of the display panel 110 based on the source control signal SCS and the timing control signal TCS, thereby sensing the characteristic values for the subpixels SP in real time even in the period in which the image is displayed.

Here, the subpixel line refers to a collection of subpixels SP in the amount of one line, adjacent to each other in the horizontal direction.

The sensing driving operation refers to an operation of sensing the characteristic value of the corresponding subpixel SP by applying sensing data to subpixels SP disposed in a specific subpixel line, and updating the compensation value for compensating for a change in the characteristic value of the corresponding subpixel SP based on the sensing result.

The display device 100 may include a power management circuit that supplies various voltages or currents to the display panel 110, the gate driving circuit 120, the data driving circuit 130, or the like, or controls various voltages or currents to be supplied.

The power management circuit generates power necessary for driving the display panel 100, the gate driving circuit 120, and the data driving circuit 130 by adjusting the direct current (DC) voltage supplied from the external host system.

The display device 100 may be one of various types of devices, such as liquid crystal displays, organic light emitting diode displays, or plasma display panels.

Figure 3:
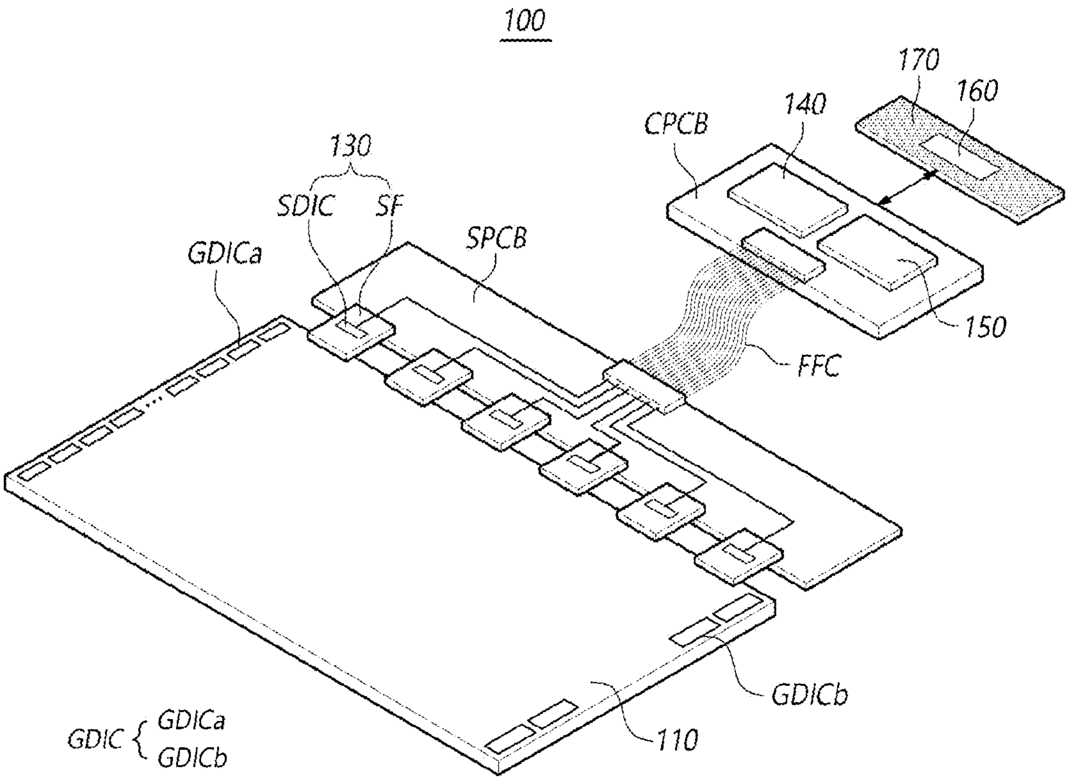
FIG. 3 is an exemplary system view illustrating a display device according to embodiments of the disclosure.

FIG. 3 is an exemplary system view illustrating a display device according to embodiments of the disclosure.

FIG. 3 illustrates an example in which in the display device 100 according to embodiments of the disclosure, the data driving circuit 130 is implemented by a chip on film (COF) type among various types (e.g., TAB, COG, and COF), and the gate driving circuit 120 is implemented by a gate in panel (GIP) type among various types (e.g., TAB, COG, COF, and GIP).

When the gate driving circuit 120 is implemented in the GIP type, the plurality of gate driving integrated circuits GDICa and GDICb included in the gate driving circuit 120 may be directly formed in the bezel area of the display panel 110. In this case, the gate driving integrated circuits GDICa and GDICb may receive various signals (e.g., a gate clock, a gate high signal, a gate low signal, etc.) necessary for generating gate signals through gate driving-related signal lines disposed in the bezel area.

Likewise, one or more source driving integrated circuits SDIC included in the data driving circuit 130 each may be mounted on the source film SF, and one side of the source film SF may be electrically connected with the display panel 110. Signal lines for electrically connecting the source driver integrated circuit SDIC and the display panel 110 may be disposed on the source film SF.

The display device 100 may include at least one source printed circuit board SPCB for circuit connection between a plurality of source driving integrated circuits SDIC and other devices and a control printed circuit board CPCB for mounting control components and various electric devices.

The other side of the source film SF where the source driving integrated circuit SDIC is mounted may be connected to at least one source printed circuit board SPCB. In other words, one side of the source film SF where the source driving integrated circuit SDIC is mounted may be electrically connected with the display panel 110, and the other side thereof may be electrically connected with the source printed circuit board SPCB.

The timing controller 140 and the power management circuit 150 may be mounted on the control printed circuit board CPCB. The timing controller 140 may control the operation of the data driving circuit 130 and the gate driving circuit 120. The power management circuit 150 may supply driving voltage or current to the display panel 110, the data driving circuit 130, and the gate driving circuit 120 and control the supplied voltage or current.

At least one source printed circuit board SPCB and control printed circuit board CPCB may be circuit-connected through at least one connection member. The connection member may include, e.g., a flexible printed circuit FPC or a flexible flat cable FFC. The at least one source printed circuit board SPCB and control printed circuit board CPCB may be integrated into a single printed circuit board.

The display device 100 may further include a set board 170 electrically connected to the control printed circuit board CPCB. In this case, the set board 170 may also be referred to as a power board. A main power management circuit 160 for managing the overall power of the display device 100 may be present on the set board 170. The main power management circuit 160 may interwork with the power management circuit 150.

In the display device 100 with above configuration, the driving voltage is generated in the set board 170 and transferred to the power management circuit 150 in the control printed circuit board CPCB. The power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 may include an light emitting element and a circuit element, e.g., a driving transistor, for driving the organic light emitting diode.

The type and number of circuit elements constituting each subpixel SP may be varied depending on functions to be provided and design schemes.

The gate driving circuit 120 may be formed of a scan driving circuit that outputs scan signals or may include a scan driving circuit that outputs scan signals and an emission driving circuit that outputs emission signals, depending on the configuration of the subpixel SP.

Figure 4:
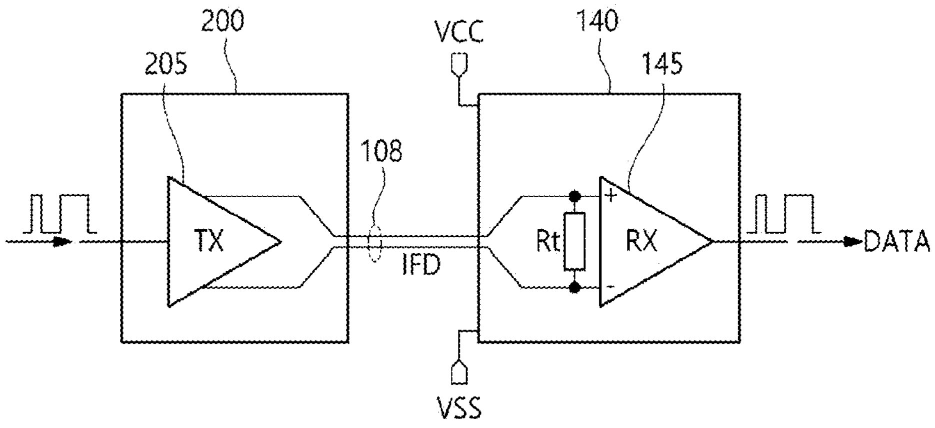
FIG. 4 is a diagram illustrating a structure for receiving an interface data signal from a host system using a low-voltage differential signaling interface in a display device for a vehicle system according to embodiments of the disclosure.

FIG. 4 is a diagram illustrating a structure for receiving an interface data signal from a host system using a low-voltage differential signaling interface in a display device for a vehicle system according to embodiments of the disclosure.

Referring to FIG. 4, the timing controller 140 of the display device 100 for a vehicle system according to embodiments of the disclosure may include a receiver (RX) 145 configured to receive an interface data signal IFD, and the host system 200 may include a transmitter (TX) 205 configured to transmit the interface data signal IFD.

The transmitter 205 converts the single-ended signal into an interface data signal IFD of a differential signal. The interface data signal IFD of the differential signal is transmitted via interface line 108 to timing controller 140 with the receiver 145.

The interface line 108 includes two signal lines. A receiving resistance Rt disposed on a side of the receiver 145 is a termination resistance and has a resistance value corresponding to the characteristic impedance of the interface line 108.

The receiving resistance Rt according to a standard of the low-voltage differential signaling (LVDS) interface may have a resistance value of 100Ω. The interface data signal IFD transmitted from the transmitter 205 may be a differential current with a range of ±2.5 mA. When the interface data signal IFD flows through the receiving resistance Rt of 100Ω in the form of a differential current, a differential voltage signal transitioning in the range of 250 mV (1.075V to 1.325V) is transmitted to the receiver 145.

The receiver 145 of the timing controller 140 detects the differential voltage signal and converts it into image data DATA of a single-ended signal. The image data DATA of the single-ended image data DATA generated by the receiver 145 is transmitted to the data driving circuit 130.

Figure 5:
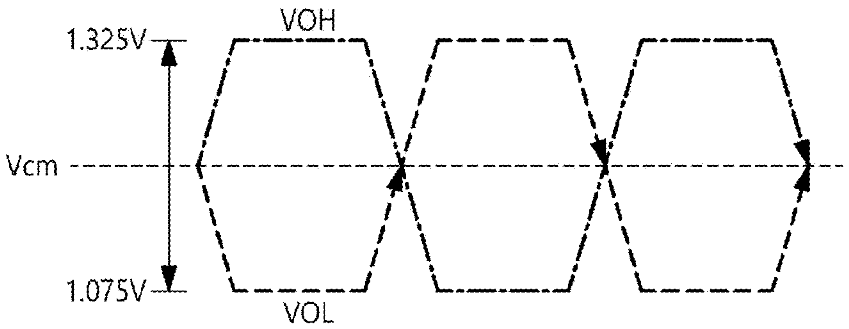
FIG. 5 is a diagram illustrating a waveform of an interface data signal transmitted from a host system to a display device in a vehicle system according to embodiments of the disclosure.

FIG. 5 is a diagram illustrating a waveform of an interface data signal transmitted from a host system to a display device in a vehicle system according to embodiments of the disclosure.

Referring to FIG. 5, the interface data signal IFD transmitted from the host system 200 to the display device 100 in the vehicle system 1000 according to embodiments of the disclosure may be a signal whose polarity changes through a switching element of the transmitter 205.

For example, the interface data signal IFD may include a first polarity voltage VOH that swings between 1.075 V and 1.325 V, and a second polarity voltage VOL that swings between 1.075 V and 1.325 V with a phase opposite to the first polarity voltage VOH.

Therefore, the common mode voltage Vcm of the interface data signal IFD may have a range between 1.075V and 1.325V and may have an average value of 1.2V.

At this time, the swing margin of the output signal in the transmitter 205 may be reduced due to the parasitic resistance. Thus, the interface data signal IFD transmitted through the interface line 108 must be able to swing with sufficient margin within the range of 1.075V to 1.375V level. Therefore, it is desirable to minimize the parasitic resistance by making the area of the receiver 145 to be sufficient for accurate and reliable detection of the interface data signal IFD.

Meanwhile, a constant current of 2.5 mA and a receiving resistance Rt of 100Ω may be used for the low-voltage differential signaling (LVDS) interface, but it may be changed within the standard range (250 mV~400 mV).

Figure 6:
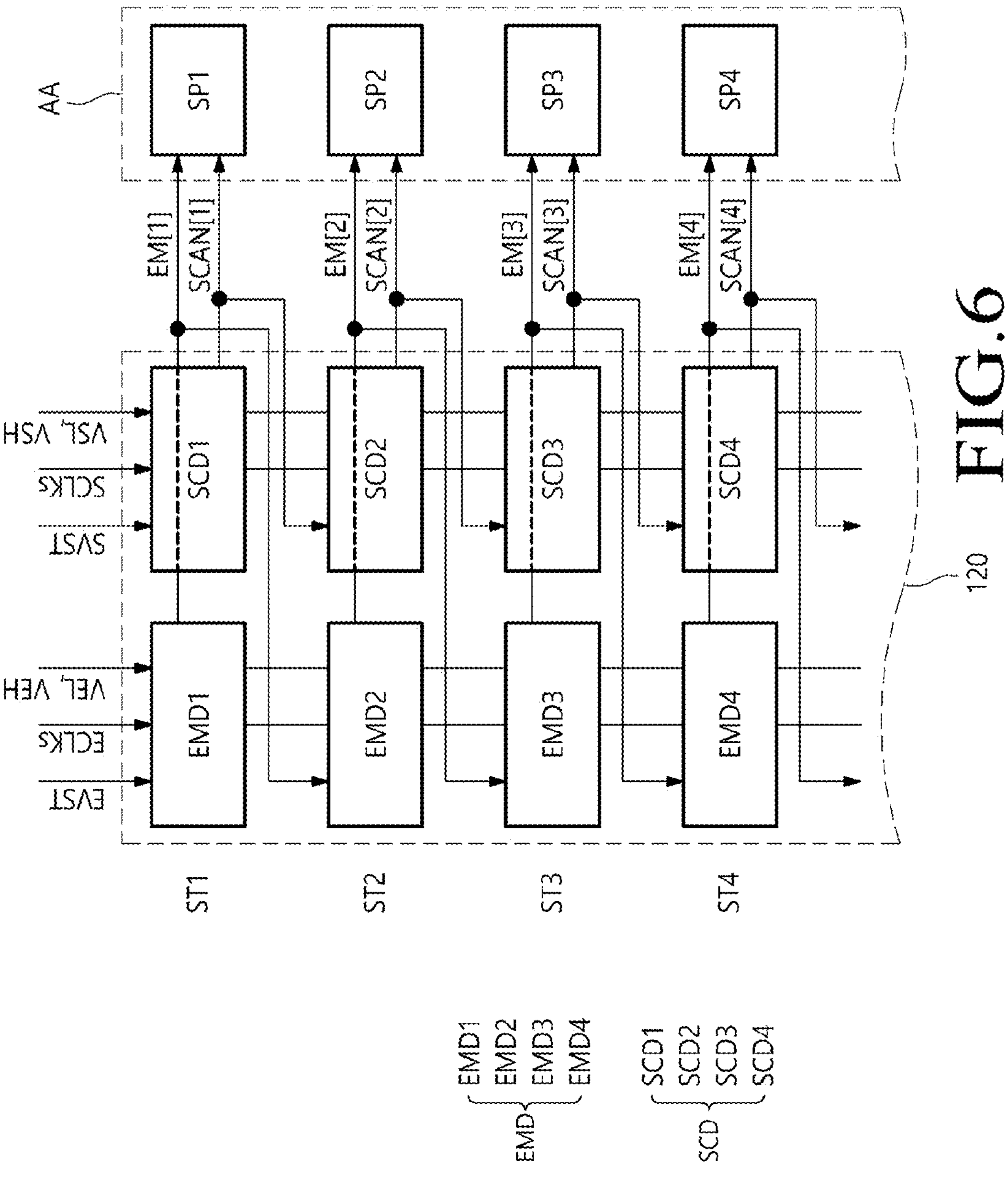
FIG. 6 is a block diagram illustrating an example gate driving circuit including a scan driving circuit and an emission driving circuit in a display device according to embodiments of the disclosure.

FIG. 6 is a block diagram illustrating an example gate driving circuit including a scan driving circuit and an emission driving circuit in a display device according to embodiments of the disclosure.

Referring to FIG. 6, the gate driving circuit 120 of the display device 100 according to embodiments of the disclosure may include a plurality of scan driving circuits SCD1-SCD4 outputting scan signals SCAN[1]-SCAN[4] used to control the switching transistors included in the plurality of subpixels SP1-SP4, and a plurality of emission driving circuits EMD1-EMD4 generating emission signals used to control the emission control transistors included in the plurality of subpixels SP1-SP4.

In this case, the scan driving circuit and the emission driving circuit together may be referred to as a gate driving integrated circuit.

When the gate driving circuit 120 is implemented in a gate-in-panel (GIP) type, the scan driving circuit SCD and the emission driving circuit EMD may be disposed as a plurality of stages ST1, ST2, ST3, ST4 in the bezel area of the display panel 110.

The emission driving circuit EMD may generate the line emission signals EM[1], EM[2], EM[3], EM[4] by operating based on the emission clocks ECLKs, the emission start signal EVST, the low-potential emission voltage VEL, and the high-potential emission voltage VEH.

In this case, the emission driving circuit EMD1 of the first line may generate the first line emission signal EM[1] using the emission start signal EVST, and the emission driving circuit EMD2 of the second line may generate the second line emission signal EM[2] using the first line emission signal EM[1] output from the emission driving circuit EMD1 of the first line. As described above, from the emission driving circuit EMD2 of the second line, the line emission signal generated by the front emission driving circuit may be used as the emission start signal.

The line emission signals EM[1], EM[2], EM[3], EM[4] may be supplied to the display panel 110 through their respective corresponding subpixel lines, and each of the line emission signals EM[1], EM[2], EM[3], EM[4] may include one or more emission signals according to the structure of the subpixel SP.

The scan driving circuit SCD may generate the line scan signals SCAN[1], SCAN[2], SCAN[3], SCAN[4] by operating based on the scan clocks SCLKs, the scan start signal SVST, the low-potential scan voltage VSL, and the high-potential scan voltage VSH.

In this case, the scan driving circuit SCD1 of the first line may generate the first line scan signal SCAN[1] using the scan start signal SVST, and the scan driving circuit SCD2 of the second line may generate the second line scan signal SCAN[2] using the first line scan signal SCAN[1] output from the scan driving circuit SCD1 of the first line. As described above, from the scan driving circuit SCD2 of the second line, the line scan signal generated by the front scan driving circuit may be used as the scan start signal.

The line scan signals SCAN[1], SCAN[2], SCAN[3], SCAN[4] may be supplied to the display panel 110 through their respective corresponding subpixel lines, and each of the line scan signals SCAN[1], SCAN[2], SCAN[3], SCAN [4] may include one or more scan signals according to the structure of the subpixel SP.

Figure 7:
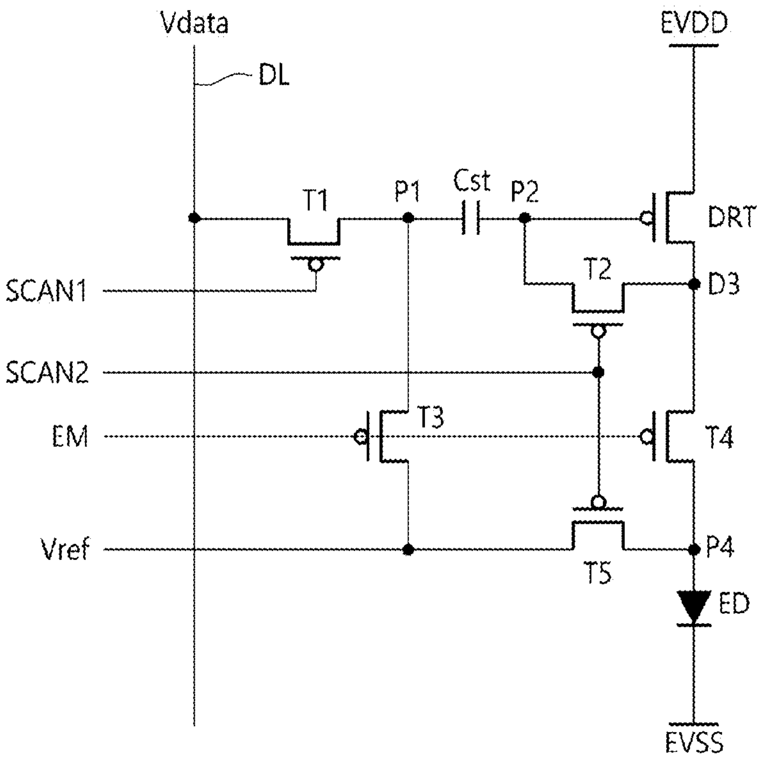
FIG. 7 is a view illustrating an example subpixel circuit in a display device according to embodiments of the disclosure.

FIG. 7 is a view illustrating an example subpixel circuit in a display device according to embodiments of the disclosure.

Referring to FIG. 7, the subpixel circuit of the display device 100 according to embodiments of the disclosure may include a light emitting element ED, a driving transistor DRT, a plurality of switching transistors T1-T5, and a storage capacitor Cst.

The driving transistor DRT and the plurality of switching transistors T1-T5 included in the subpixel circuit may be implemented as PMOS type low temperature poly silicon (LTPS) transistors, thereby securing a desired response characteristic.

Alternatively, at least one of the plurality of switching transistors T1-T5 may be implemented as an NMOS type or a PMOS type oxide transistor having good leakage current characteristics when turned off, and the remaining switching transistors may be implemented as PMOS type LTPS transistors having good response characteristics.

The light emitting element ED emits light by a driving current adjusted according to the gate-source voltage Vgs of the driving transistor DRT. The anode electrode of the light emitting element ED is connected to the fourth node P4, and the cathode electrode of the light emitting element ED is connected to the low-potential pixel voltage EVSS.

When the light emitting element ED is an organic emission diode, an organic compound layer is provided between the anode electrode and the cathode electrode.

The organic compound layer may include a hole injection layer HIL, a hole transport layer HTL, an emission layer EML, an electron transport layer ETL, and an electron injection layer EIL. For example, two or more organic compound layers emitting different colors of light may be stacked according to a tandem structure.

When a driving current flows through the light emitting element ED, holes passing through the hole transport layer HTL and electrons passing through the electron transport layer ETL move to the emission layer EML to form excitons, and as a result, the emission layer EML may emit visible light.

The driving transistor DRT controls a current flowing through the light emitting element ED according to the gate-source voltage Vgs. The gate electrode of the driving transistor DRT is connected to the second node P2, the drain electrode (or source electrode) is connected to a driving voltage line supplying the high-potential pixel voltage EVDD, and the source electrode (or drain electrode) is connected to the third node P3.

The subpixel circuit may include a first switching transistor T1 to a fifth switching transistor T5 capable of sampling the gate-source voltage Vgs and a storage capacitor Cst to compensate for the threshold voltage or mobility of the driving transistor DRT.

The first switching transistor T1 is connected between the data line DL and the first node P1, and is switched according to the first scan signal SCAN1. The gate electrode of the first switching transistor T1 is connected to the first gate line to which the first scan signal SCAN1 is applied, the drain electrode (or source electrode) is connected to the data line DL, and the source electrode (or drain electrode) is connected to the first node P1.

The second switching transistor T2 is connected between the second node P2 and the third node P3, and is switched according to the second scan signal SCAN2. The gate electrode of the second switching transistor T2 is connected to the second gate line to which the second scan signal SCAN2 is applied, the drain electrode (or source electrode) is connected to the third node P3, and the source electrode (or drain electrode) is connected to the second node P2.

Since one electrode of the second switching transistor T2 is connected to the gate electrode of the driving transistor DRT, it is preferable that the second switching transistor T2 has good Off current characteristics. Accordingly, the second switching transistor T2 may be designed in a dual gate structure to suppress leakage current when turned off.

In the dual gate structure, the first gate electrode and the second gate electrode are connected to each other to have the same potential, and the channel length is longer than that of the single gate structure. As the channel length increases, the resistance increases, and the leakage current decreases when turned off, so that stability of operation may be secured. However, the second switching transistor T2 may be implemented as a single gate structure, and in this case, the second switching transistor T2 may be implemented as an oxide transistor.

The third switching transistor T3 is connected between the first node P1 and the reference voltage line to which the reference voltage Vref is applied, and is switched according to the emission signal EM. The gate electrode of the third switching transistor T3 is connected to the third gate line to which the emission signal EM is applied, the drain electrode (or source electrode) is connected to the first node P1, and the source electrode (or drain electrode) is connected to the reference voltage line.

The fourth switching transistor T4 is connected between the third node P3 and the fourth node P4, which is the anode electrode of the light emitting element ED, and is switched according to the emission signal EM. The gate electrode of the fourth switching transistor T4 is connected to the third gate line to which the emission signal EM is applied, the drain electrode (or source electrode) is connected to the third node P3, and the source electrode (or drain electrode) is connected to the fourth node P4. Since the fourth switching transistor T4 controls the driving current flowing through the light emitting element ED, it may be referred to as an emission control transistor.

The fifth switching transistor T5 is connected between the fourth node P4 and the reference voltage line, and is switched according to the second scan signal SCAN2. The gate electrode of the fifth switching transistor T5 is connected to the second gate line to which the second scan signal SCAN2 is applied, the drain electrode (or source electrode) is connected to the fourth node P4, and the source electrode (or drain electrode) is connected to the reference voltage line.

The storage capacitor Cst is connected between the first node P1 and the second node P2.

The display device 100 according to the disclosure may operate the driving circuit and the display panel using power supplied from the host system.

Figure 8:
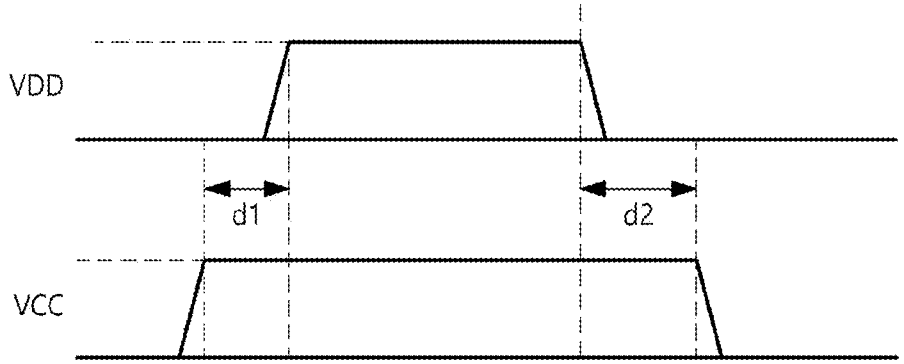
FIG. 8 is a view illustrating an example power waveform of a host system supplied to a display device according to embodiments of the disclosure.

FIG. 8 is a view illustrating an example power waveform of a host system supplied to a display device according to embodiments of the disclosure.

Referring to FIG. 8, the display device 100 according to embodiments of the disclosure may operate driving circuits such as the timing controller 140 and the power management circuit 150 using the first power VCC supplied from the host system 200, and may drive the display panel 110 using the second power VDD supplied from the host system 200.

The first power VCC supplied from the host system 200 to operate the driving circuit such as the timing controller 140 and the power management circuit 150 may be referred to as circuit power, and the first power VCC may be 3.3 V. Further, the second power VDD supplied from the host system 200 to drive the display panel 110 may be referred to as panel power, and the second power VDD may be 20V.

In this case, in order for the display device 100 to be normally turned on, it is preferable that the driving circuit is first operated by the first power supply VCC and, after a turn-on delay time d1 elapses, then the display panel 110 is driven by the second power supply VDD.

Further, in order for the display device 100 to be normally turned off, it is preferable that the second power VDD is cut off to turn off the display panel 110 and, after a turn-off delay time d2 elapses, the first power VCC is cut off to turn off the driving circuit.

However, when the first power VCC and the second power VDD supplied from the host system 200 are abnormally cut off due to a battery error and so on, a gate signal may be applied before the display panel 110 is turned off, so that a display error may occur.

Figure 9:
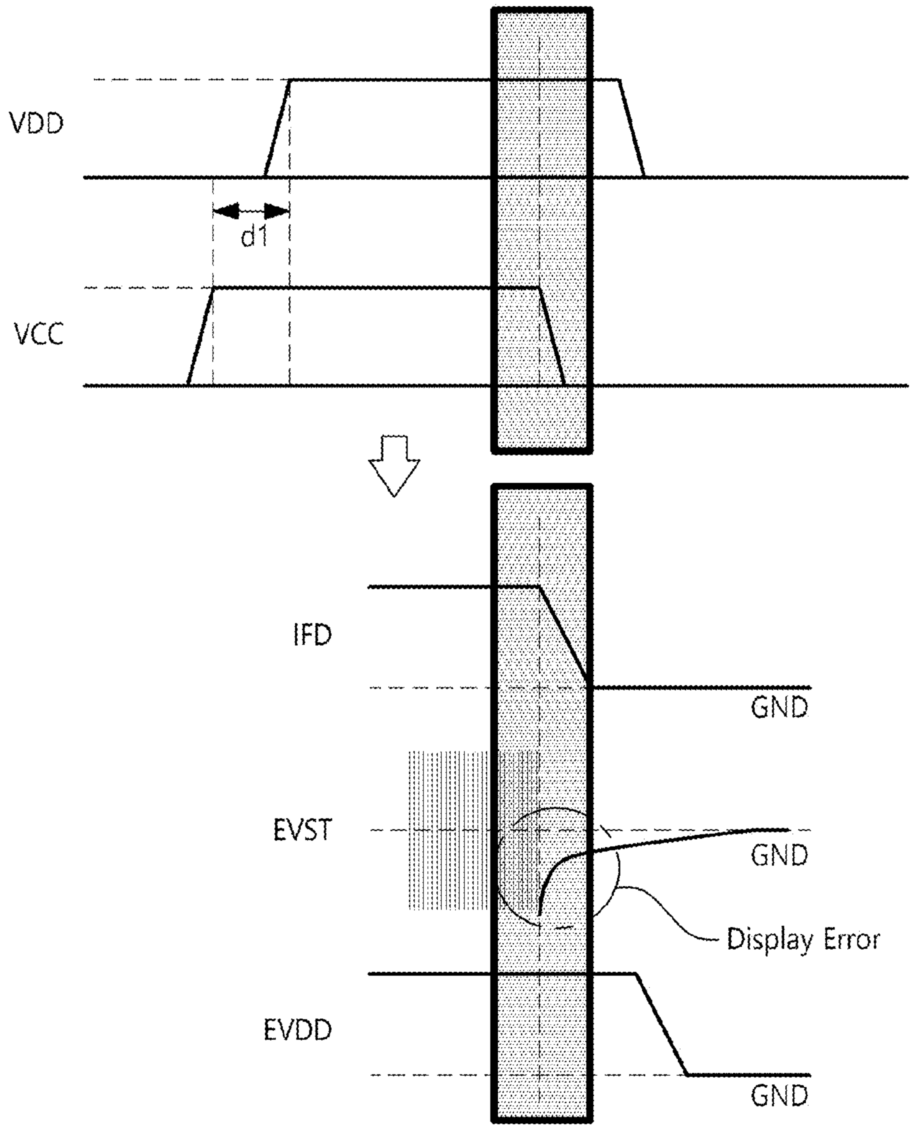
FIG. 9 is a view illustrating an example signal error when power supplied to a host system is abnormally cut off in a display device according to embodiments of the disclosure.

FIG. 9 is a view illustrating an example signal error when power supplied to a host system is abnormally cut off in a display device according to embodiments of the disclosure.

Referring to FIG. 9, in order for the display device 100 according to embodiments of the disclosure to be normally turned off, it is needed that the second power VDD for driving the display panel 110 is turned off and then the first power VCC operating the driving circuit is turned off after a predetermined turn-off delay time d2 elapses.

However, when the host system is abnormally cut off, such as when the battery power is turned off, the first power VCC for operating the driving circuit may be cut off in a state in which the second power VDD is turned on.

When the second power VDD is turned on, the high-potential pixel voltage EVDD for driving the display panel 110 also maintains the turn-on state. Therefore, some of the image data DATA transmitted through the interface data signal IFD may be supplied to the display panel 110.

In this case, while the gate control signal GCS supplied to the gate driving circuit 120 through the level shifter 180 is cut off, a display error in which some subpixels SP emit light may occur due to the emission signal EM supplied to the display panel 110.

For example, when the emission control transistor (T4 in FIG. 7) of the subpixel SP is a PMOS transistor, the emission control transistor emits light by the low-level emission signal EM, and thus a display error occurs in which a partial area of the display panel 110 emits light by the low-level emission signal EM applied while the gate control signal GCS is cut off.

When the power of the host system 200 is abnormally cut off, the display device 100 according to the disclosure detects this and cuts off the emission control transistor of the display panel 110, thereby preventing an accident caused by a display error.

Figure 10:
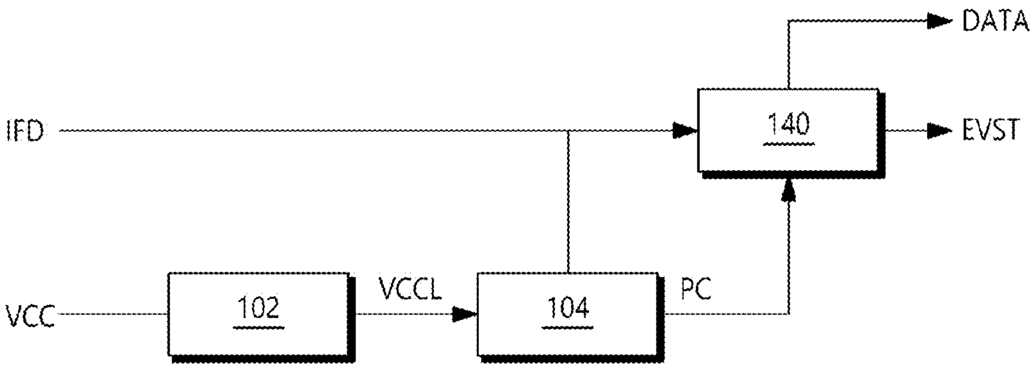
FIG. 10 is a circuit block diagram for controlling an emission of the display panel by detecting changes in circuit power and interface data signal in the display device according to embodiments of the disclosure.

FIG. 10 is a circuit block diagram for controlling an emission of the display panel by detecting changes in circuit power and interface data signal in the display device according to embodiments of the disclosure.

Referring to FIG. 10, the display device 100 according to embodiments of the disclosure may include a converter 102 configured to convert a first level circuit power VCC supplied from the host system 200 into a second level circuit power VCCL corresponding to a level of the interface data signal IFD, a logic gate 104 configured to generate a power check signal PC depending on the interface data signal IFD and the second level circuit power VCCL, and a timing controller 140 configured to generate an emission start signal EVST that controls emission of the display panel 110 based on the power check signal PC.

In order to calculate the circuit power VCC and the interface data signal IFD in the logic gate 104, the circuit power VCC needs to be supplied at the same voltage level as the interface data signal IFD.

The circuit power VCC supplied from the host system 200 is a power voltage for operating the driving circuits such as the timing controller 140 and the power management circuit 150, and may be 3.3V. In contrast, in the case of a low-voltage differential signaling (LVDS) interface, the common mode voltage Vcm of the interface data signal IFD transmitted through the interface line 108 may have an average value of 1.2V.

Therefore, it is effective that the converter 102 converts the first level circuit power VCC with relatively high level into a level of the second level circuit power VCCL same as the interface data signal IFD at low level.

At this time, when the output voltage of the converter 102 suddenly increases, a voltage drop in the battery may occur due to inrush current, which may cause malfunction of other circuits constituting the vehicle system 1000. To reduce this problem, the converter 102 may be configured with a Low Drop Out regulator (LDO) with a soft start function to smoothly change the output voltage and reduce inrush current.

The LDO regulator may generate an output voltage with a potential level proportional to the potential level of the reference voltage. Accordingly, when the reference voltage is gradually increased in the form of a ramp waveform, the second level circuit power VCCL generated from the converter 102 is also gradually increased to implement a soft start. The soft start time may be controlled by a slope of the reference voltage.

On the other hand, when the host system 200 is abnormally cut off, such as when the battery power is turned off, the circuit power VCC for operating the driving circuit and the interface data signal IFD may be turned off while the panel power VDD is turned on.

Accordingly, the logic gate 104 may be configured to generate the power check signal PC by detecting that the second level circuit power VCCL and the interface data signal IFD are turned off simultaneously.

FIG. 11 illustrates a table of logic gate comparing a second level circuit power and an interface data signal in a display device according to embodiments of the disclosure.

Referring to FIG. 11, the display device 100 according to embodiments of the disclosure may detect a case (Case 1) when the circuit power VCC for operating the driving circuit and the interface data signal IFD are turned off to low level due to the host system 200 being abnormally cut off.

Therefore, the logic gate 104 may be configured as a NOR gate that generates the power check signal PC at a high level when the circuit power VCC and the interface data signal IFD are at low levels.

The timing controller 140 may control the emission start signal EVST supplied to the display panel 110 by using the power check signal PC generated from the logic gate 104.

That is, when the power check signal PC at high level is transmitted from the logic gate 104, the timing controller 140 may determine that the host system 200 is abnormally turned off, and may generate an emission start signal EVST at a turn-off level for blocking an emission of the display panel 110.

At this time, the converter 102 and the logic gate 104 may be implemented together on a control printed circuit board where the timing controller 140 is disposed, or may be included inside the timing controller 140 in the form of an integrated circuit.

Figure 12:
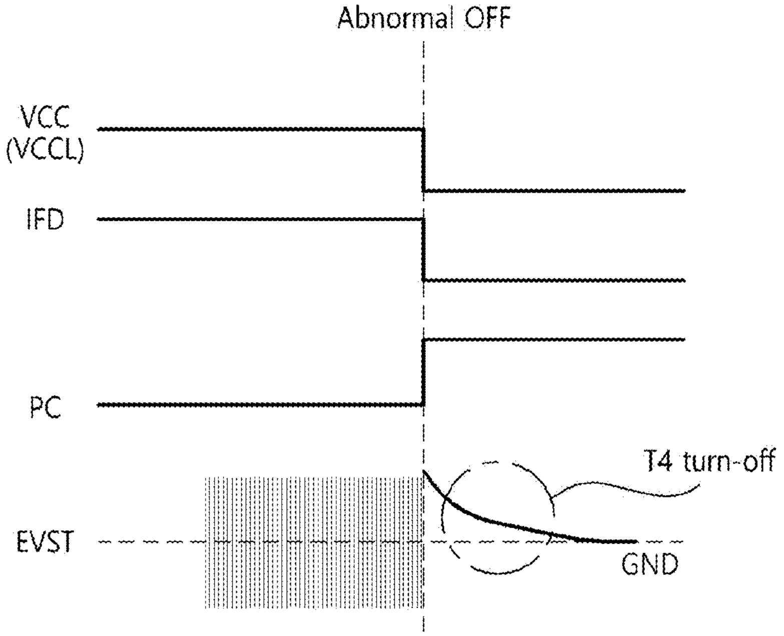
FIG. 12 illustrates waveforms of a power check signal and an emission start signal depending on a circuit power and an interface data signal in a display device according to embodiments of the disclosure.
Figure 13A:
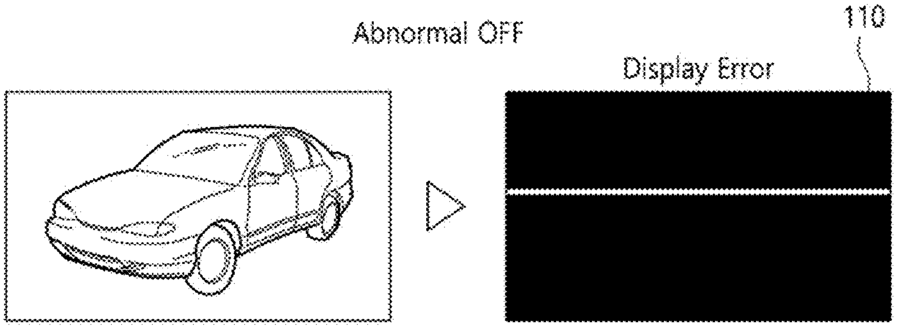
FIGS. 13A and 13B are views illustrating an example screen state of a display panel when a display device is abnormally turned off.
Figure 13B:
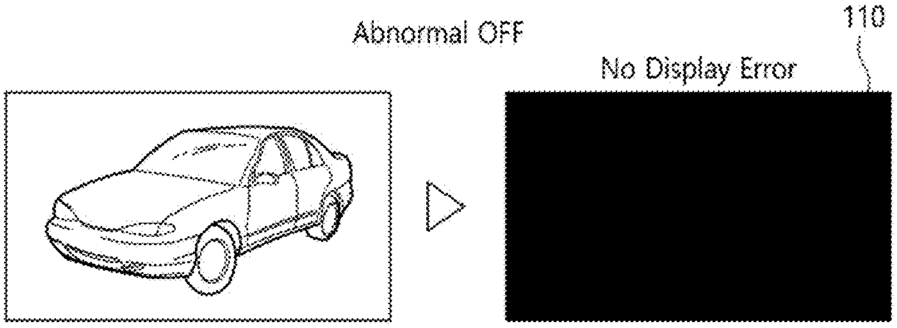

FIG. 12 illustrates waveforms of a power check signal and an emission start signal depending on a circuit power and an interface data signal in a display device according to embodiments of the disclosure. In addition, FIGS. 13A and 13B are views illustrating an example screen state of a display panel when a display device is abnormally turned off.

Referring to FIGS. 12 and 13, when the display device 100 according to embodiments of the disclosure is normally turned off, the panel power VDD driving the display panel 110 is turned off and, after a predetermined turn-off delay time elapses, the circuit power VCC operating the driving circuit is turned off.

However, when the host system is abnormally turned off, such as when the battery power is cut off, the circuit power VCC for operating the driving circuit may be lowered to the ground voltage GND less than or equal to the threshold value and the interface data signal IFD transmitted through the interface line 108 may be blocked in a state in which the high-potential pixel voltage EVDD for driving the display panel 110 is turned on.

As described above, when the circuit power VCC supplied from the host system is abnormally lowered, the high-potential scan voltage and the scan start signal SVST interworking with the circuit power VCC may also be lowered. As a result, the PMOS type switching transistors (e.g., T1 and T2 of FIG. 7) of the subpixel receiving the scan start signal SVST may be turned on.

However, the display device 100 of the disclosure transmits the circuit power VCC at the turn-off level and the power check signal PC corresponding to the interface data signal IFD to the timing controller 140, and the timing controller 140 may maintain the emission start signal EVST at the turn-off level (high level). As a result, the PMOS-type emission control transistor (e.g., T4 of FIG. 7) of the subpixel receiving the emission start signal EVST may be turned off to reduce an display error.

In other words, when an abnormal power off occurs due to a battery error, etc., the display device 100 of the disclosure may generate an emission start signal EVST at a turn-off level by detecting changes in the circuit power VCC and the interface data signal IFD.

As a result, while the conventional display device 100 of a vehicle system 1000 may experience a display error on the display panel 11 as shown in FIG. 13A due to abnormal turned-off, the display device 100 according to the disclosure may reduce a display error on the display panel 110 and an accident by turning off the emission control transistor (T4 of FIG. 7) as shown in FIG. 13B although the circuit power VCC is abnormally turned off.

Embodiments of the disclosure described above are briefly described below.

A display device of the disclosure may comprise a display panel including a plurality of subpixels, a gate driving circuit configured to supply a scan signal and an emission signal to the display panel through a plurality of gate lines, a converter configured to convert a first level circuit power supplied from a host system into a second level circuit power, a logic gate configured to generate a power check signal based on an interface data signal transmitted through an interface line and the second level circuit power, and a timing controller configured to control an emission start signal supplied to the gate driving circuit depending on the power check signal.

The subpixel includes a light emitting element, a driving transistor controlling a current flowing to the light emitting element according to a gate-source voltage, a first switching transistor connected between a data line and a first node, and switched depending on a first scan signal, a second switching transistor connected between a second node and a third node, and switched depending on a second scan signal, a third switching transistor connected between the first node and a reference voltage line, and switched depending on the emission signal, a fourth switching transistor connected between the third node and an anode electrode of the light emitting element, and switched depending on the emission start signal, a fifth switching transistor connected between the anode electrode and the reference voltage line, and switched depending on the second scan signal, and a storage capacitor connected between the first node and the second node.

The driving transistor is a PMOS-type low temperature poly silicon (LTPS) transistor.

At least one of the first switching transistor to the fifth switching transistor is a PMOS-type oxide transistor.

The gate driving circuit includes a first scan driving circuit configured to generate a first line scan signal using the scan start signal, one or more subsequent scan driving circuits configured to generate a subsequent line scan signal using a line scan signal transmitted from a front scan driving circuit, a first emission driving circuit configured to generate a first emission signal using the emission start signal, and one or more subsequent emission driving circuits configured to generate a subsequent emission signal using an emission signal transmitted from a front emission driving circuit.

The first level circuit power is a power for driving the timing controller.

The interface data signal is a low-voltage differential data signal transmitted through a low-voltage differential signaling (LVDS) interface.

The second level circuit power has a level same as a common mode voltage of the low-voltage differential data signal.

The converter is a LDO regulator with soft start function.

The logic gate is a NOR gate.

The emission start signal is generated at a level that turns off the display panel when the first level circuit power and the interface data signal are at a turn-off level.

The converter, the logic gate, and the timing controller are implemented on a control printed circuit board.

In addition, a vehicle system of the disclosure may comprise a display panel including a plurality of subpixels, a gate driving circuit configured to supply a scan signal and an emission signal to the display panel through a plurality of gate lines, a converter configured to convert a first level circuit power supplied from a host system into a second level circuit power, a logic gate configured to generate a power check signal based on an interface data signal transmitted through an interface line and the second level circuit power, and a timing controller configured to control an emission start signal supplied to the gate driving circuit depending on the power check signal.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a display panel including a plurality of subpixels;

a gate driving circuit configured to supply a scan signal and an emission signal to the display panel through a plurality of gate lines;

a converter configured to convert a first level circuit power supplied from a host system into a second level circuit power;

a logic gate configured to generate a power check signal based on an interface data signal transmitted directly from the host system through an interface line and the second level circuit power; and a timing controller configured to control an emission start signal supplied to the gate driving circuit different from a data driving circuit based on the power check signal.

2. The display device of claim 1, wherein the subpixel includes:

a light emitting element;

a driving transistor controlling a current flowing to the light emitting element according to a gate-source voltage;

a first switching transistor coupled between a data line and a first node, and switched depending on a first scan signal;

a second switching transistor coupled between a second node and a third node, and switched depending on a second scan signal;

a third switching transistor coupled between the first node and a reference voltage line, and switched depending on the emission signal;

a fourth switching transistor coupled between the third node and an anode electrode of the light emitting element, and switched depending on the emission start signal;

a fifth switching transistor coupled between the anode electrode and the reference voltage line, and switched depending on the second scan signal; and a storage capacitor coupled between the first node and the second node.

3. The display device of claim 2, wherein the driving transistor is a PMOS-type low temperature poly silicon transistor.

4. The display device of claim 2, wherein at least one of the first switching transistor to the fifth switching transistor is a PMOS-type oxide transistor.

5. The display device of claim 2, wherein the timing controller is configured to turn off the fourth switching transistor by generating the emission start signal at a turn-off level when the host system is abnormally turned off.

6. The display device of claim 1, wherein the gate driving circuit includes:

a first scan driving circuit configured to generate a first line scan signal using the scan start signal;

one or more subsequent scan driving circuits configured to generate a subsequent line scan signal using a line scan signal transmitted from a front scan driving circuit;

a first emission driving circuit configured to generate a first emission signal using the emission start signal; and one or more subsequent emission driving circuits configured to generate a subsequent emission signal using an emission signal transmitted from a front emission driving circuit.

7. The display device of claim 1, wherein the first level circuit power is a power for driving the timing controller.

8. The display device of claim 1, wherein the interface data signal is a low-voltage differential data signal transmitted through a low-voltage differential signaling interface.

9. The display device of claim 8, wherein the second level circuit power has a level same as a common mode voltage of the low-voltage differential data signal.

10. The display device of claim 1, wherein the converter is a Low Drop Out regulator with soft start function.

11. The display device of claim 1, wherein the logic gate is a NOR gate.

12. The display device of claim 1, wherein the emission start signal is generated at a level that turns off the display panel when the first level circuit power and the interface data signal are at a turn-off level.

13. The display device of claim 1, wherein the converter, the logic gate, and the timing controller are implemented on a control printed circuit board.

14. A vehicle system, comprising:
- a body having a motor mounted therein;
- at least one display panel in the body, the at least one display panel including a plurality of subpixels;
- a gate driving circuit configured to supply a scan signal and an emission signal to the display panel through a plurality of gate lines;
- a converter configured to convert a first level circuit power supplied from a host system into a second level circuit power;
- a logic gate configured to generate a power check signal based on an interface data signal transmitted directly from the host system through an interface line and the second level circuit power; and
- a timing controller configured to control an emission start signal supplied to the gate driving circuit different from a data driving circuit depending on the power check signal.

15. The vehicle system of claim 14, wherein the first level circuit power is a power for driving the timing controller.

16. The vehicle system of claim 14, wherein the interface data signal is a low-voltage differential data signal transmitted through a low-voltage differential signaling interface.

17. The vehicle system of claim 16, wherein the second level circuit power has a level same as a common mode voltage of the low-voltage differential data signal.

18. The vehicle system of claim 14, wherein the converter is a Low Drop Out regulator with soft start function.

19. The vehicle system of claim 14, wherein the logic gate is a NOR gate.

20. The vehicle system of claim 14, wherein the emission start signal is generated at a level that turns off the display panel when the first level circuit power and the interface data signal are at a turn-off level.

* * * * *